UNITED STATES PATENT OFFICE.

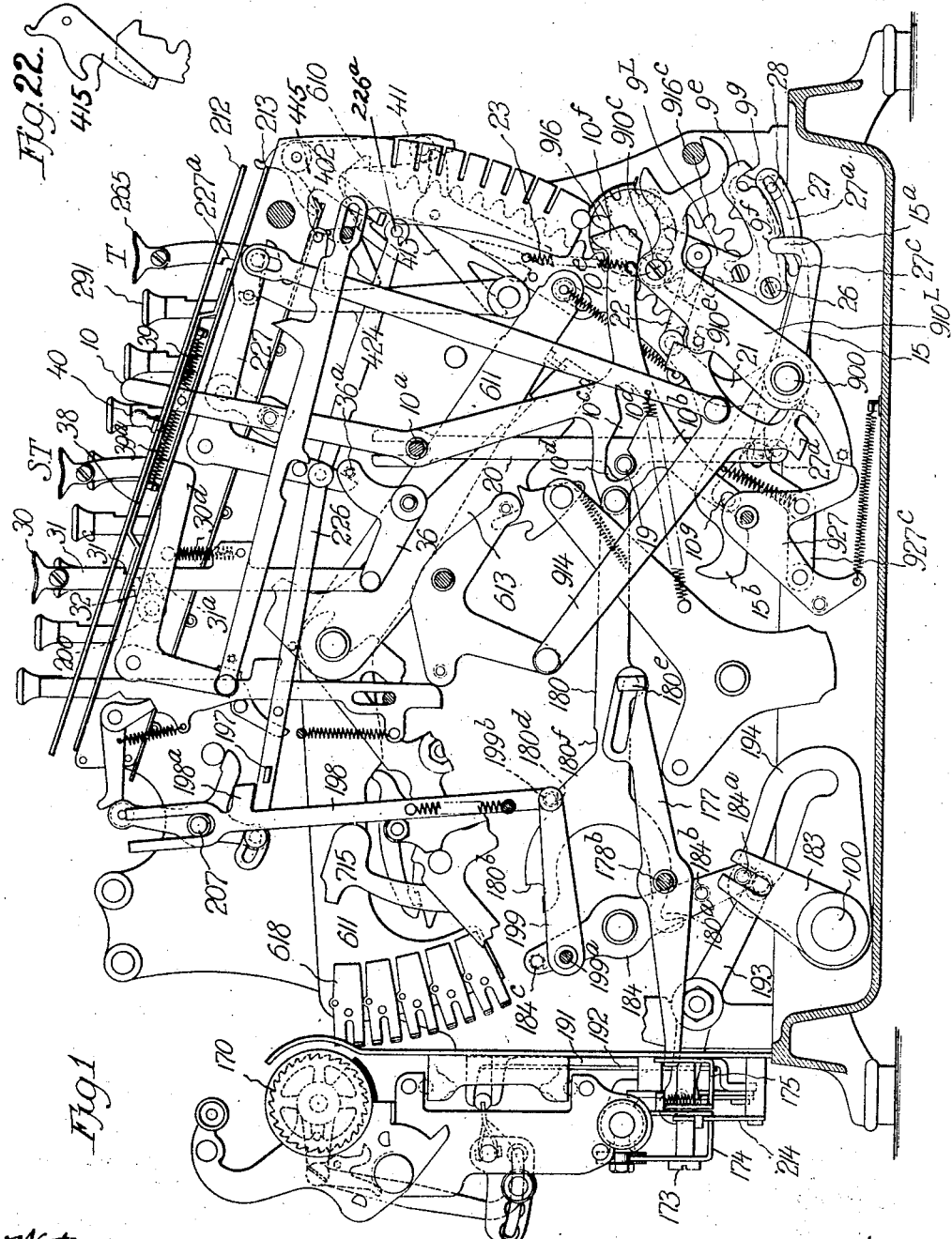

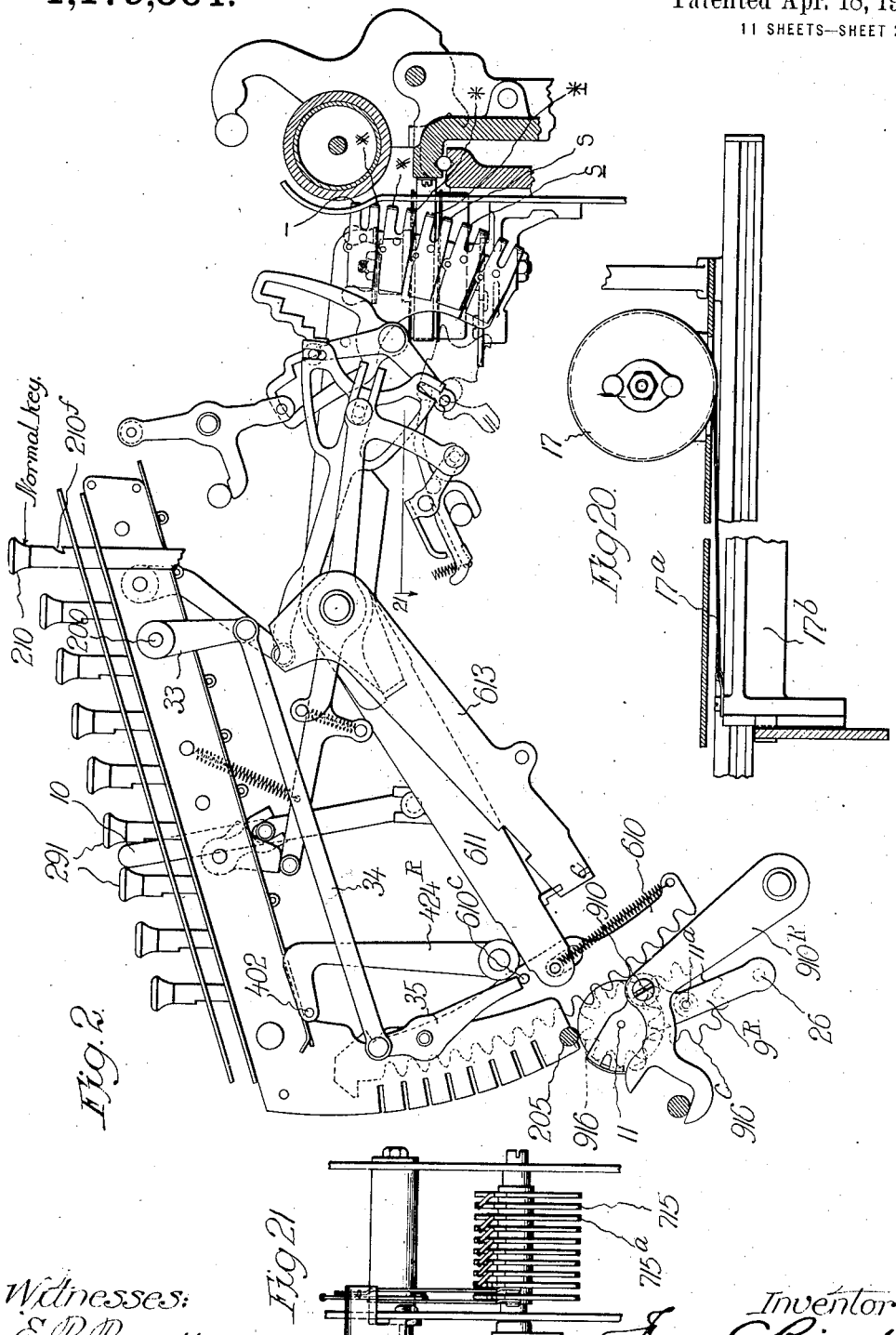

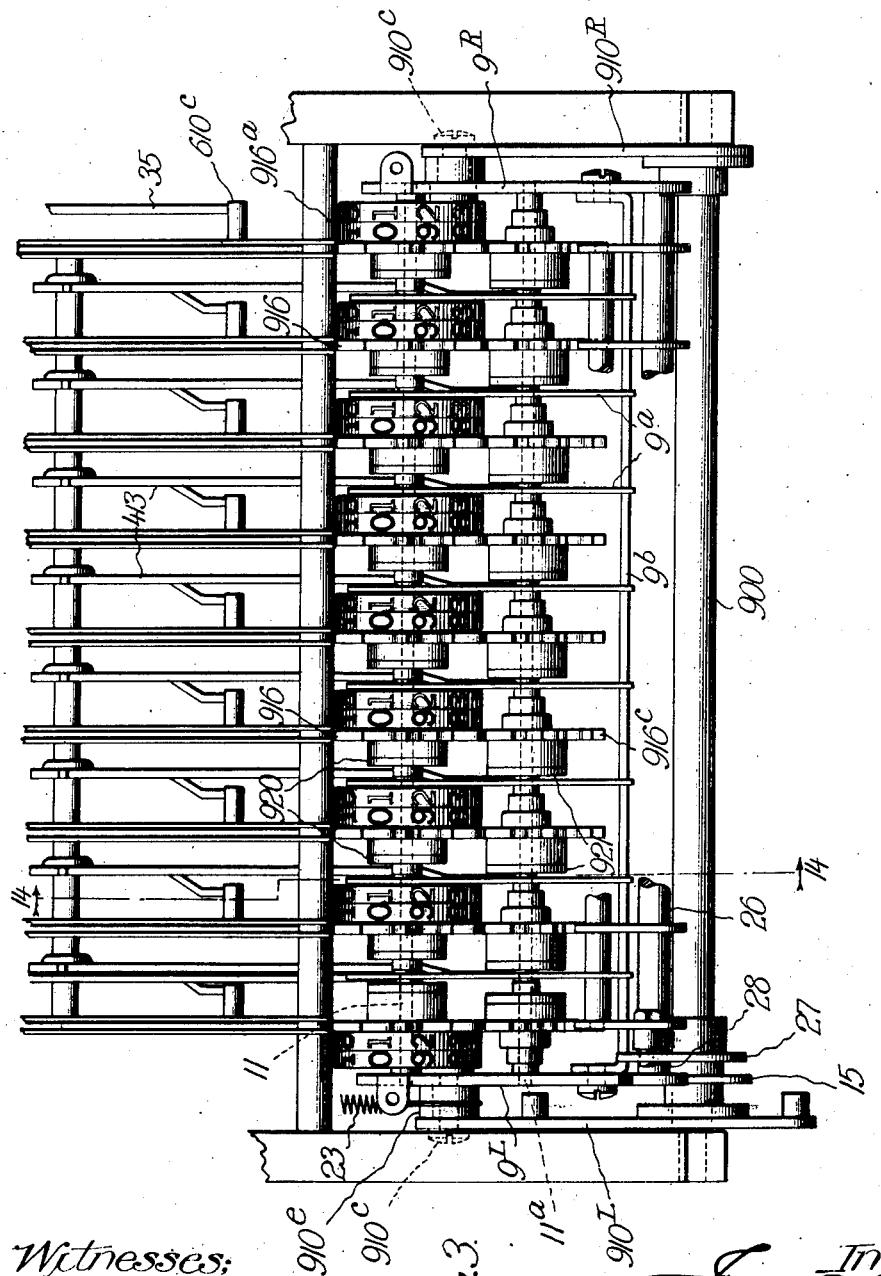

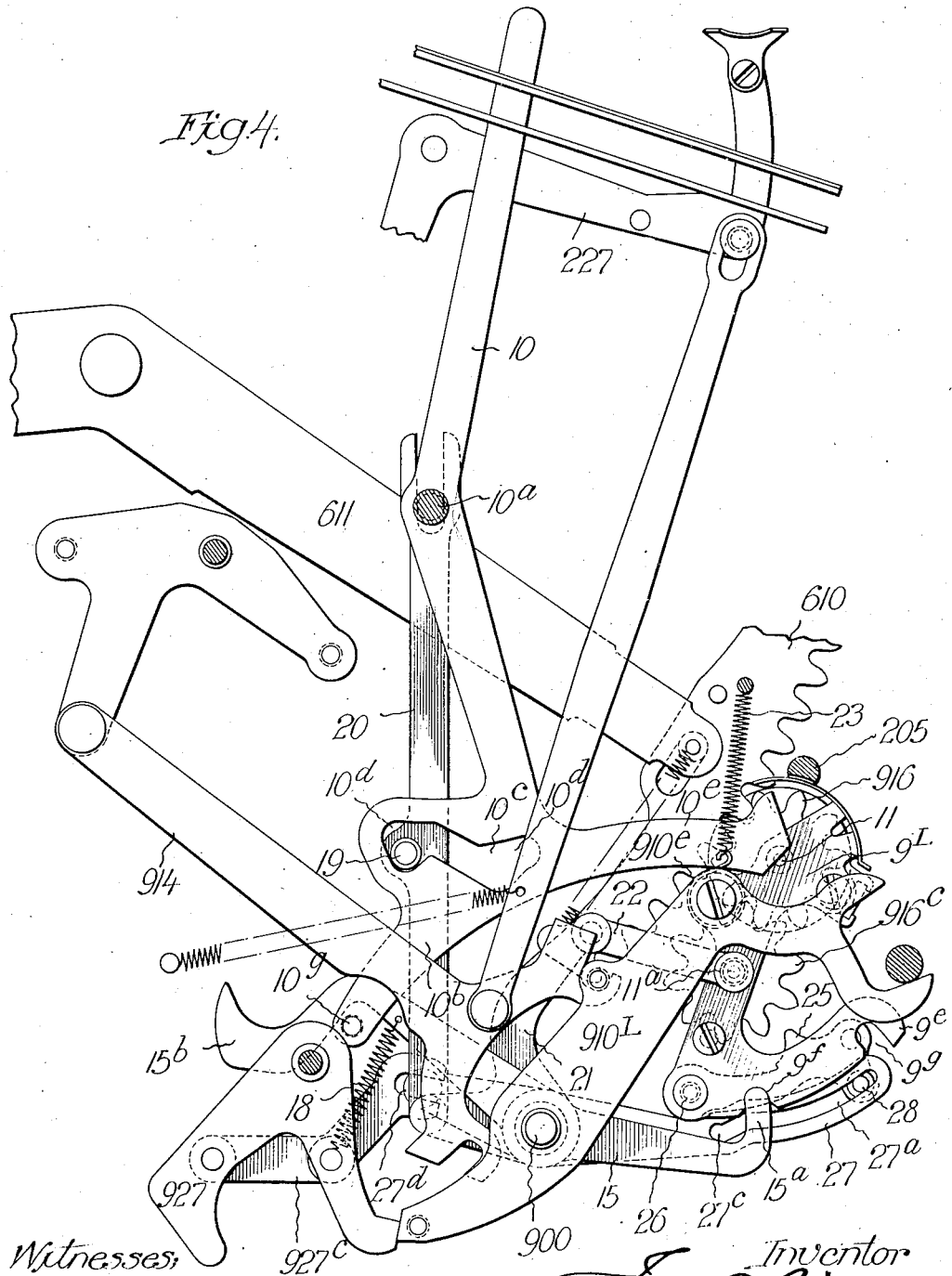

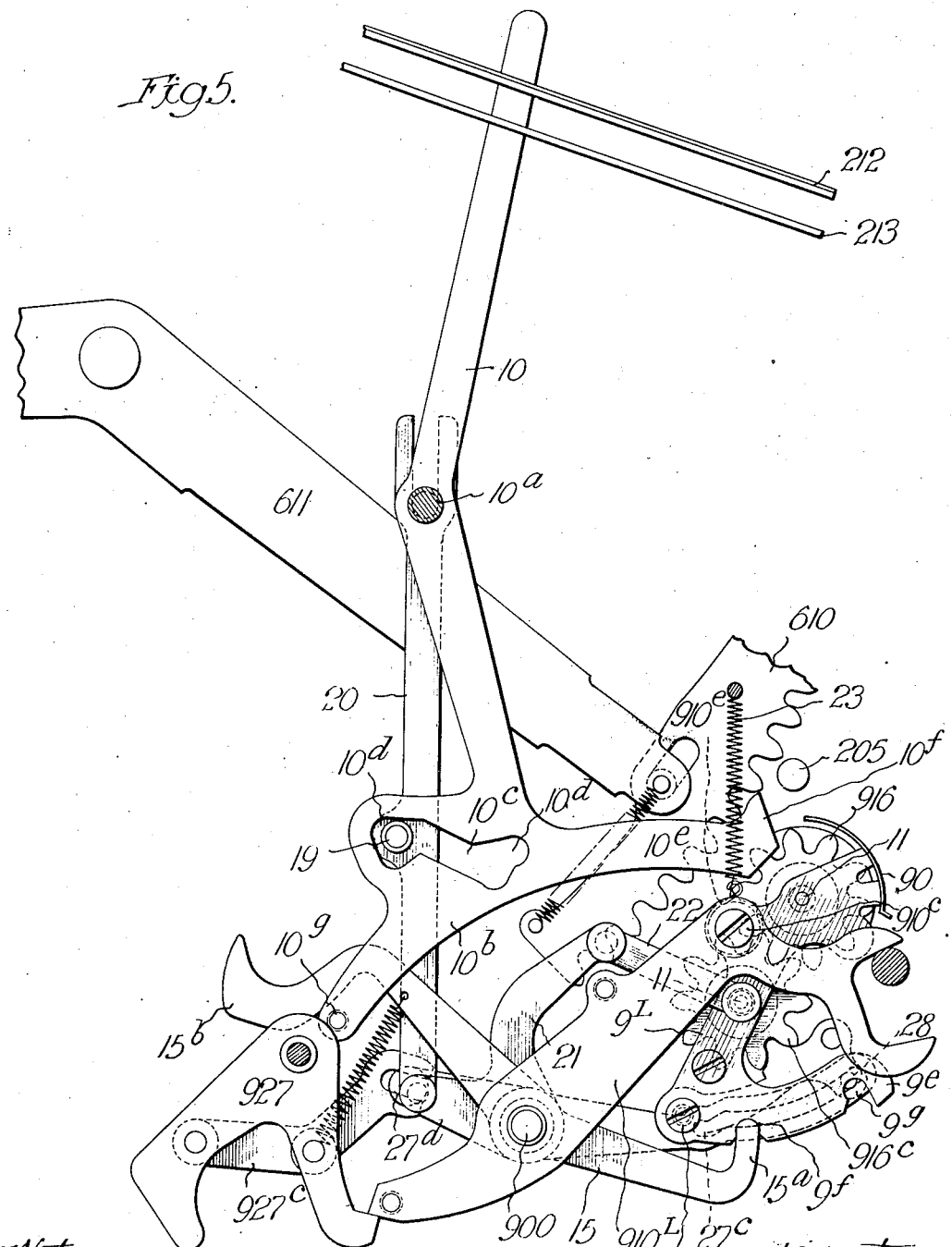

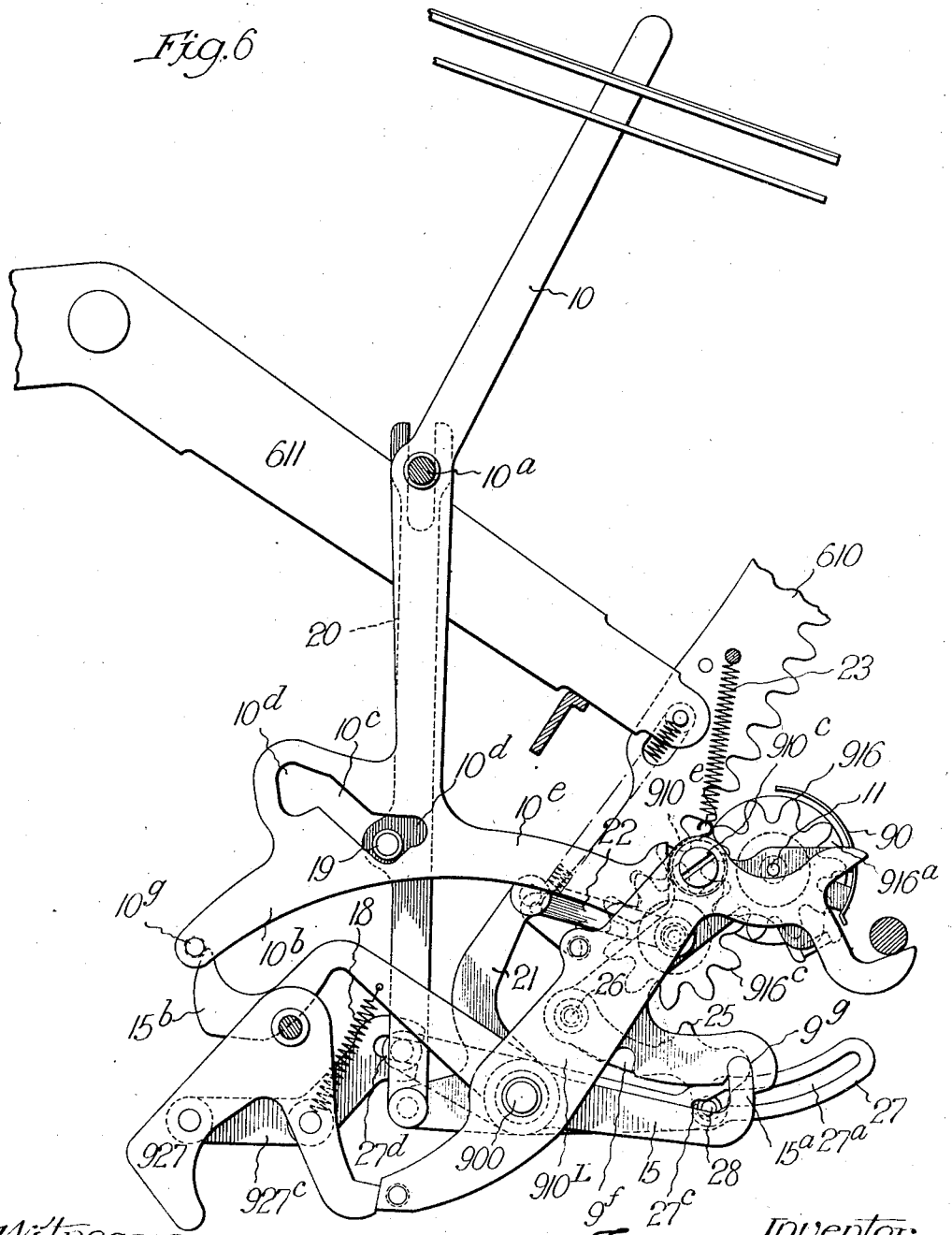

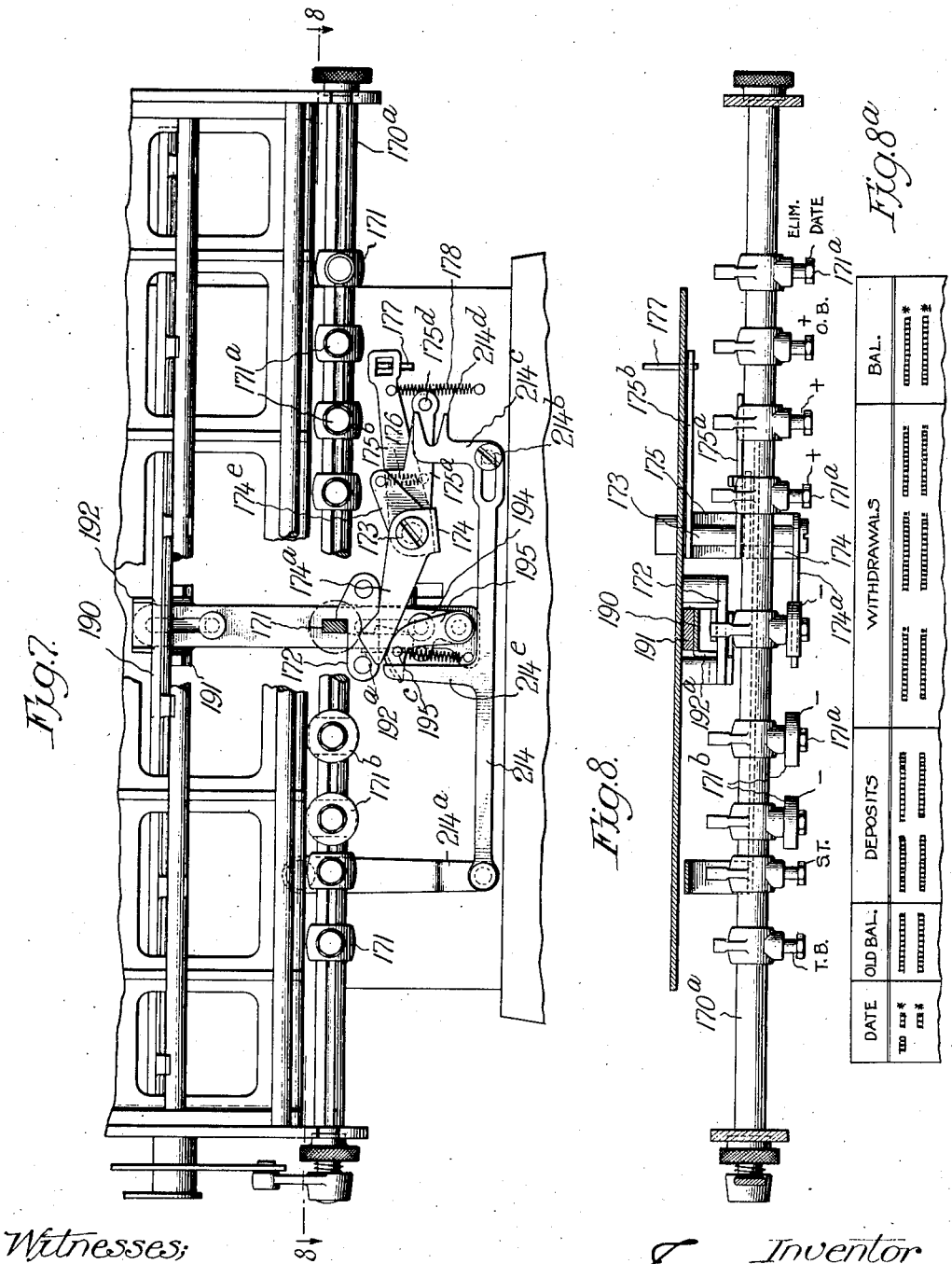

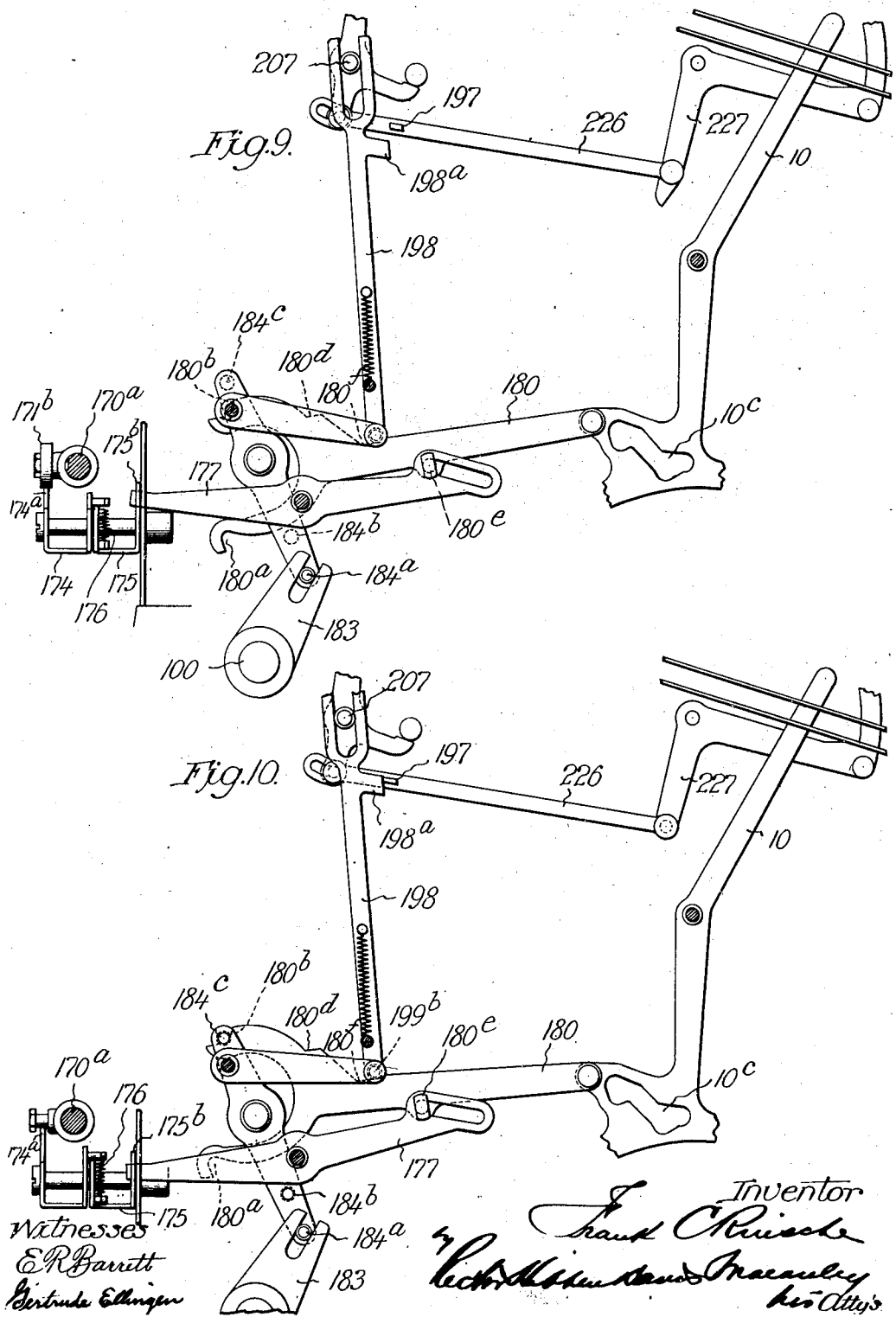

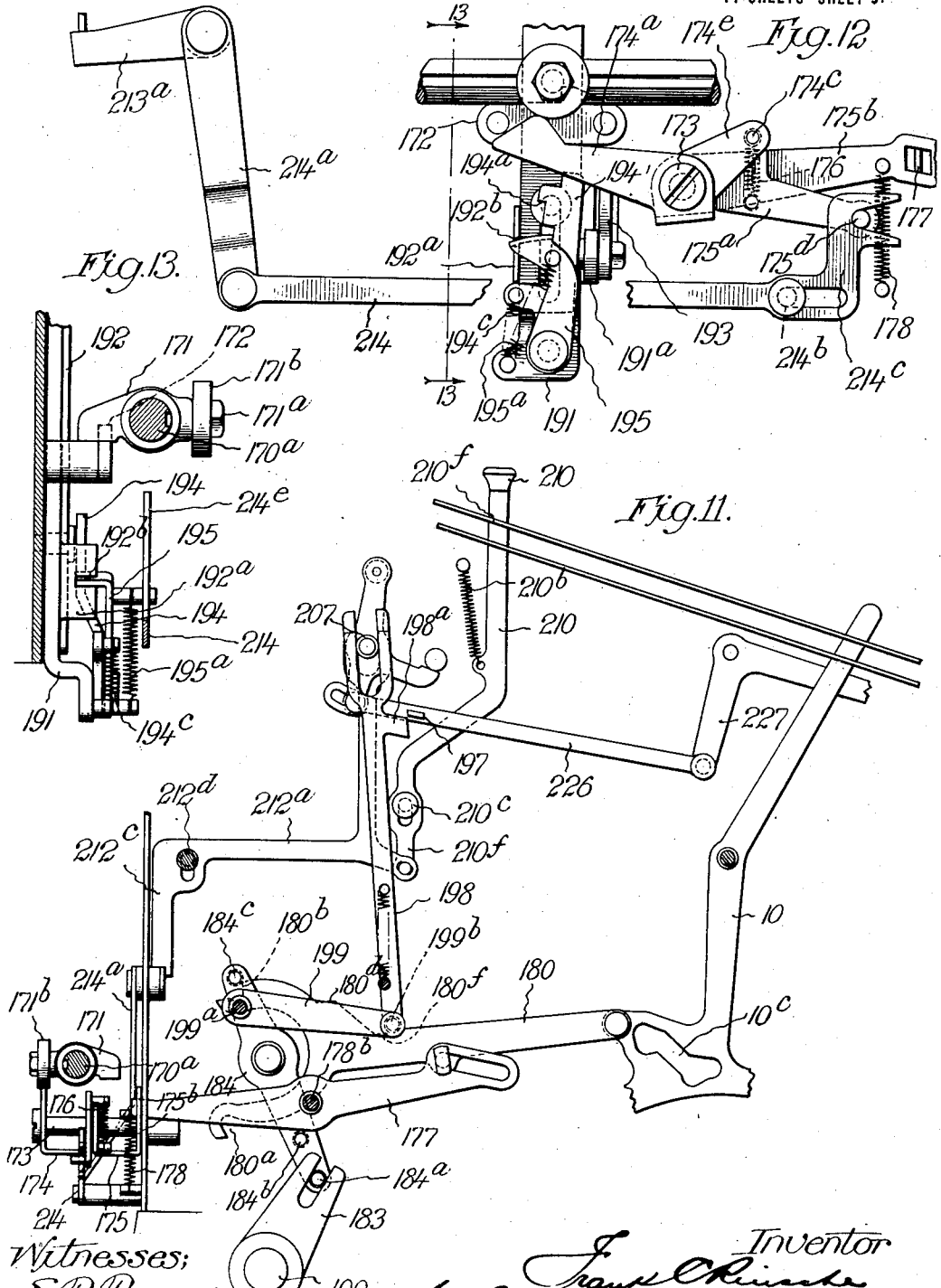

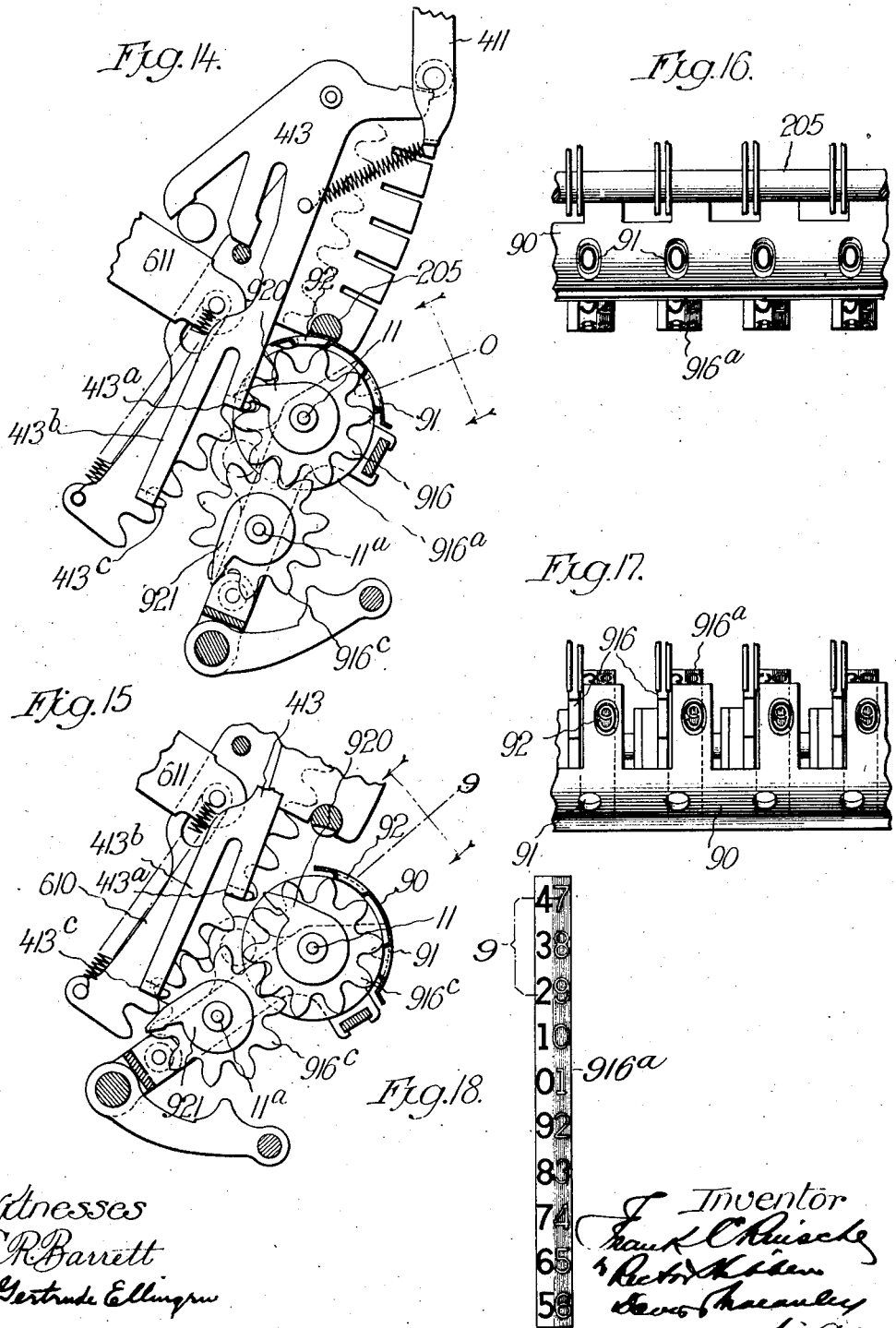

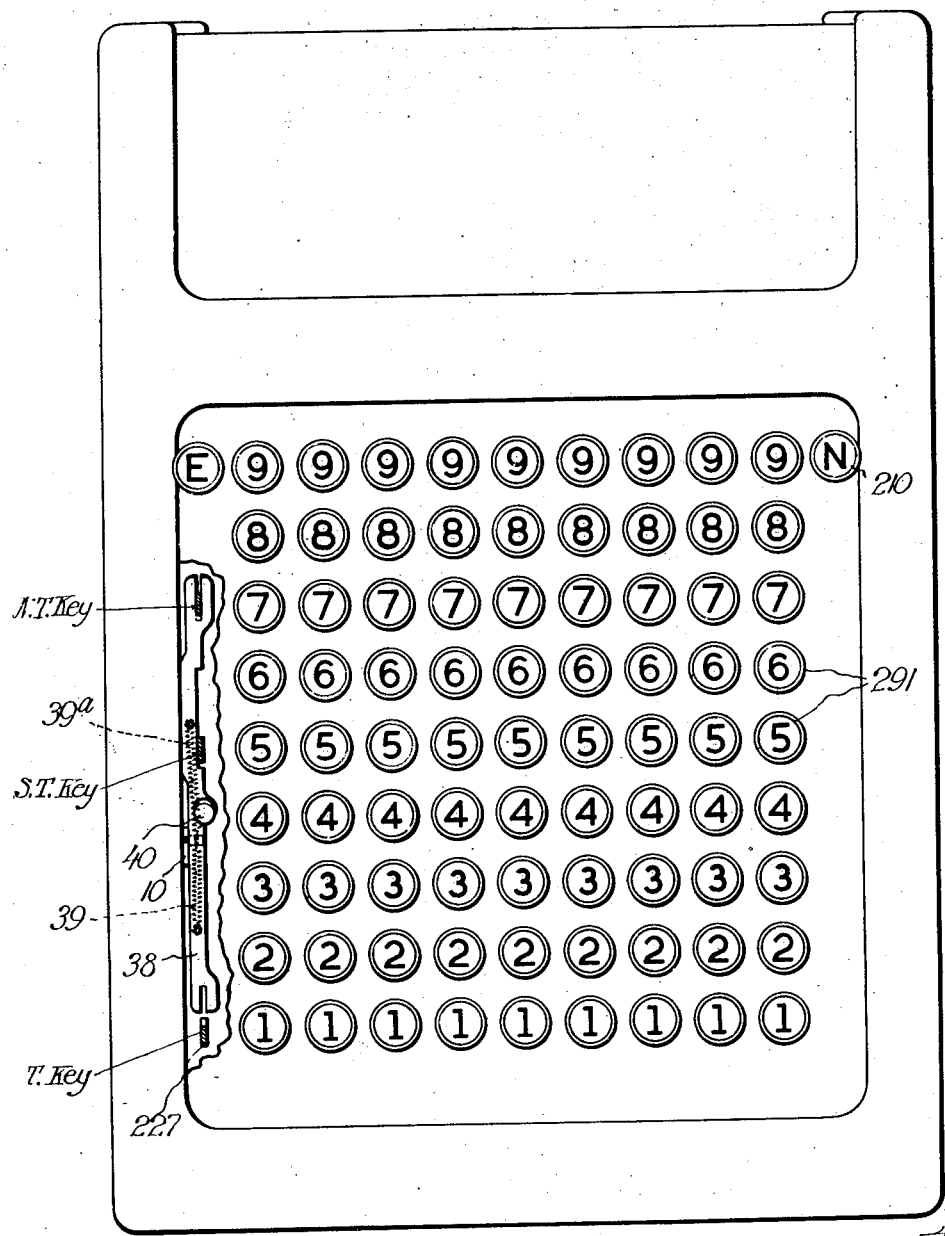

FRANK C. RINSCHE, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,179,564. Specification of Letters Patent. Patented Apr. 18, 1916.

Application filed September 11, 1911. Serial No. 648,683.

*To all whom it may concern:*

Be it known that I, FRANK C. RINSCHE, a citizen of the United States, residing at Detroit, in the county of Wayne and State of Michigan, have invented certain new and useful Improvements in Adding-Machines, of which the following is a specification.

The present invention relates to adding machines arranged for the performance of subtraction when desired, by direct process as distinguished from the adding of complemental amounts.

One object is to not only provide for readily manipulating to set the machine for either addition or subtraction, but also to provide for an automatic control in connection with a laterally shiftable paper carriage so that tabulating such as that practised in a bank calling for addition of one or more amounts printed along a horizontal line and then subtraction of one or more amounts printed along the same line, may go on automatically.

The invention further provides a special equipment for securing a correct negative total as for example the amount by which a depositor in a bank has overdrawn his account.

With these and incidental objects in view the invention consists in certain novel features of construction and combinations of parts the essential elements whereof are recited in appended claims and a preferred form of embodiment of which is illustrated in the accompanying drawings and described in detail hereinafter.

Of said drawings Figure 1 represents the complete machine in left-side elevation, the inclosing casing being omitted and one side frame piece and certain frame studs being shown in cross-section; Fig. 2 is a similar right-side elevation of a considerable portion of the machine; Fig. 3 is a front elevation of the accumulating section or department; Figs. 4, 5 and 6 are left-side elevations on a large scale as compared with Fig. 1 and confined to the front portion of the machine, Fig. 4 illustrating the parts at normal as in Fig. 1, Fig. 5 illustrating an abnormal condition under the adding adjustment and Fig. 6 illustrating the normal condition under subtracting adjustment; Fig. 7 is a partial rear elevation of the machine certain parts being broken away to disclose others; Fig. 8 is a horizontal section taken on the line 8—8 of Fig. 7; Fig. 8ª represents diagrammatically tabulated work such as the machine is capable of performing; Figs. 9, 10 and 11 illustrate the carriage connections for controlling the adding and subtracting adjustments, Fig. 9 representing the subtracting adjustment, Fig. 10 the same adjustment but a different condition in that a change to an adding adjustment has been prepared for, and Fig. 11 also showing the subtraction adjustment but differing from both Fig. 9 and Fig. 10 in showing the carriage connections neutralized by the use of a special key; Fig. 12 is a view somewhat similar to Fig. 7 though not including as much of the machine and further differing in showing a relation of parts corresponding with that illustrated in Fig. 11; Fig. 13 is a vertical section taken on line 13—13 of Fig. 12; Figs. 14 and 15 are sectional left-side elevations of the accumulating department of the machine and particularly the carrying mechanism, Fig. 14 showing an adding adjustment and Fig. 15 a subtracting adjustment; Figs. 16 and 17 are fragmentary front elevations representing the view had of the inscriptions on the registering wheels by the user of the machine under the adding adjustment (Fig. 16) and under the subtracting adjustment (Fig. 17); Fig. 18 represents a developed periphery of one of the registering wheels; Fig. 19 is a plan view of the machine. Fig. 20 is a sectional plan view of the spring connection for shifting the paper carriage. Fig. 21 is a plan section on line 21—21 of Fig. 2. Fig. 22 is a detail elevation of a special rack latch.

The invention is here shown as applied to a machine of the well known Burroughs type, although it is to be understood that the invention is not limited to such machine but is adaptable to other types of adding machines. In view of the disclosures in numerous issued patents it will be unnecessary to describe the mechanism proper in all of its departments. Reference may be had in this connection to Patents Nos. 504,963 and 505,078 issued September 12, 1893 and others to be specifically mentioned hereinafter at appropriate places. The customary form of racks 610 are shown mounted in the usual way for carrying purposes on levers 611 normally upheld by a swinging frame or bail 613 and carrying at their rear ends segmental series of type plates 618. Said racks are individually released and their descent controlled by the usual stop wires set in the regular way by depression of amount keys 291. There is in the present instance a rocking frame which operates after the manner of the usual rocking frame to disengage and reëngage registering wheels or pinions with said racks. But the wheels are not journaled on a rod fixedly supported in such rocking frame. There are two sets or series of pinions intermeshed in pairs and supported in another rocking frame or cradle whereby through adjustment of the latter either set of pinions may be put into direct coöperative relation with the racks so that the other set of pinions will then be turned reversely to their turning when directly engaged with the racks. The main rocking frame comprises right and left side pieces 910$^R$ and 910$^L$ secured as usual to a rock shaft 900 and the left side piece being as usual extended downward and rearward for coaction with a spring-held locking bell crank 927. Pivot studs 910$^c$ secured in the side pieces 910$^R$ and 910$^L$ support the secondary rocking frame or cradle which comprises side pieces 9$^R$ and 9$^L$, also intermediate plates 9$^a$ and a tie bar 9$^b$, Fig. 3. Above and below the pivot of this cradle journal rods 11 and 11$^a$ extend from side to side thereof and upon these rods are journaled the two sets of pinions. The upper set of pinions 916 have unified with them respectively registering wheels 916$^a$ each peripherally inscribed with two series of numerals and ciphers one series running reversely to the other and the two so related that, in connection with an apertured shield presently to be described, numerals representing an accumulation will be displayed under an adding adjustment and numerals representing the complement of the accumulation under a subtracting adjustment. The adding adjustment is that illustrated in Figs. 1, 4, 14 and 16, the pinions 916 being directly in mesh with the racks. The subtracting adjustment is that illustrated in Figs. 6, 15 and 17, the lower pinions 916$^c$ being directly in mesh with the racks. It will be obvious that either condition can be brought about by rocking the before described cradle. The latter carries a shield plate 90 with two series of sight openings 91 and 92 circumferentially spaced a distance corresponding with two teeth of a pinion 916, see Fig. 15, and the two series being staggered with relation to each other so that the openings 91 aline with the adding series of numerals and the openings 92 aline with the subtracting or complementary series of numerals. The latter are illustrated in the drawings on shaded portions of the wheels and in Fig. 18 a wheel periphery is shown developed and a bracket designates the relation between the series which provides for a numeral of the adding series (2) shown at an opening 91 while the complemental numeral "7" is at an opening 92. The shield plate is fixedly mounted upon the cradle and so simply rocks with it. But it is so located thereon that when the upper pinions 916 are in mesh with the racks the openings 92 are concealed from view and the openings 91 are presented to the view of the user disclosing the addition numerals, or the ciphers of the addition series as illustrated in Fig. 16, whereas when the cradle is rocked to put the lower pinions 916$^c$ in mesh with the racks, the other set of openings 92 will be presented to the view of the user and the openings 91 will be carried practically out of range so that the numerals or ciphers of the complemental series will be exposed as illustrated in Fig. 17.

It will be obvious that with the upper pinions 916 in direct coöperative relation with the racks registering wheels 916$^a$ will be turned as usual for adding items and obtaining totals or subtotals thereof, whereas when the cradle is rocked to put the lower pinions 916$^c$ into direct coöperative relation with the racks, said registering wheels will be reversed in action. It follows therefore that under the latter adjustment subtraction can be performed by backward turning of the wheels 916$^a$ produced through movement of the racks in the same direction that they ordinarily move in turning the wheels forward. Hence it is only necessary to arrange appropriate carrying or borrowing mechanism in order to carry on subtraction by the same mode of manipulation as commonly practised in performing addition, to wit depressing amount keys and pulling the operating handle. Of course in such case it is to be assumed that there is, to begin with an accumulation upon the wheels 916$^a$ representing a minuend, the amount key being depressed to set up a subtrahend. Then the complement of the remainder will show under the subtraction adjustment of the registering mechanism whereas the remainder itself will show when the adding adjustment is effected.

So long as there is a remainder or balance it may be printed in the ordinary way, to wit by depressing the total key 265 with the pinions 916 in mesh with the racks and pulling the operating handle. If the minuend has been exceeded in subtraction then the minus quantity or so-called negative total cannot be had in this way for it will be obvious that the ordinary totaling operation would cause the complement thereof to be printed. However if the totaling operation is performed with the lower pinions 916$^c$ in mesh with the racks the minus quantity or negative total itself will be printed excepting that it will be one cent short owing to the necessary zero-setting equipment, unless some provision is made to take care of this. The present invention makes such provision in a manner presently to be described.

The pinions 916 have carrying cams 920 of the usual form which coöperate with feet 413$^a$ on the carrying pawls 413 to effect a tripping of the transfer mechanism under forward rotation of said pinions, in the ordinary manner and with the familiar result, and to abut against said feet under reverse rotation to stop the wheels at zero. For borrowing purposes the pawls 413 have downwardly extending portions 413$^b$ with feet 413$^c$ to coöperate with cams 921 on the pinions 916$^c$ in the same manner that the feet 413$^a$ coöperate with cams 920, it being understood of course that under a subtracting adjustment such as illustrated in Fig. 15 the cams 920 are out of line with said feet 413$^a$ and that under an adding adjustment as illustrated in Fig. 14 the cams 921 are out of line with the feet 413$^c$. Inasmuch as the transfer action in borrowing takes place when wheels 916$^a$ are turning backward from zero to nine whereas such action occurs in addition when said wheels are turning forward from 9 to 0, the cams 921 and 920 are not correspondingly related to their respective pinions. This is illustrated in Figs. 14 and 15 wherein it will be observed that when a cam 920 is at the zero position the cam 921 of the intermeshed pinion is a step short of zero position. It results that when the pinions 916$^c$ are turned backward and their cams brought into contact with the feet 913$^c$ the wheels 916$^a$ will display ciphers under the subtraction adjustment and nines under the adding adjustment or vice versa if the wheels 916 are turned backward and their cams 920 brought against the feet 920$^a$ ciphers will be displayed under the adding adjustment and nines under the subtracting adjustment. Owing to this necessary relation of parts for carrying and borrowing purposes it will be obvious that the complement displayed at any time by the wheels 916$^a$ will be one cent short and consequently the corresponding registration on the wheels 916$^c$ will be such that reverse rotation of said wheels to zero position will set up an amount one cent short.

It is preferable to provide for adding the one cent otherwise than by putting down the "1" key in the units bank and operating the machine, as by some manipulation specially assigned to the obtaining of the negative total. In the present instance I provide a special key for this purpose preferably located at the left hand side of the keyboard and designated in the drawings by the numeral 30. The depending stem 31 of this key has a stud 31$^a$ occupying a bifurcation of a short arm 32 (Fig. 1) which is secured to a rock shaft 200. This rock shaft at the opposite side of the machine (Fig. 2) has secured to it a depending arm 33 coupled by a horizontal link 34 to a pivoted abutment piece 35 located adjacent the units rack 610. The latter has the same slot, spring and pin connection with its supporting lever 611 that other racks have with their supporting levers though ordinarily the units rack does not ascend beyond its normal position, a permanent stop being provided to prevent this. In the present instance the abutment piece 35 takes the place of the permanent stop and normally holds the units rack down, the latter being provided with a stud 610$^c$ bearing against said abutment piece as illustrated in Fig. 2. However upon depression of key 30 the abutment piece is swung upon its pivot and the units rack permitted to rise. The key is so used when a negative total is to be printed with the result that, the lower pinions 916$^c$ being in mesh with the racks, the units pinion is advanced one step so that when thereupon a totaling operation is practised the units pinion will move backward an additional step and the correct negative total will be set up. Of course this adding to the negative total may involve a carry since the units pinion might be registering 9 at the time, in which case the tens pinion would also partake of a one step movement and so on. Now since such may be the case it is desirable to guard against depression of the key 30 unless the transfer mechanisms are at normal ready to respond if called upon. There is here shown the customary means for preventing depression of the total key while transfer mechanism is out of normal, the same comprising a bar 424 whose cross rod 402 engages shoulders of the transfer latch 411, Fig. 1. For similarly preventing depression of the negative total key 3t the stem of the latter is coupled at its lower end to a bell-crank lever 36 whose upward projecting arm has a stud 36$^a$ extending in front of the total key bell-crank 227. Consequently so long as the total key is locked out the negative total key will be. While through these connections depression of the key 30 will cause a movement of the total key 265, this is not of sufficient extent to disturb the operation, a comparatively slight movement of said key 30 being sufficient to perform its function of swinging the lower end of the abutment piece 35 out of engagement with the rack stud 610$^c$. Said key 30 is normally upheld by spring 30$^d$ and is limited in its downward movement as hereinafter explained.

The fact that the adding of the one cent to the registration on the wheels 916$^c$ will subtract it from the registration on the wheels 916$^a$ is of no consequence with regard to the taking of a negative total if the machine is to be cleared. On the other hand if the operation is a subtotaling one, then the one cent should be restored but this can of course readily be done by operating the key 30 with the upper pinions 916 in mesh with the racks.

To give a concrete example of negative totaling let it be supposed that the minuend has been exceeded in subtraction by 1.30, assuming a machine of nine banks capacity. The wheels 916$^a$ will display through their addition series of numerals the complement of the minus amount, to wit 9,999,998.70. The wheels 916$^c$ will then in effect be registering 1.29, it being obvious that these wheels and the pinions 916 of wheels 916$^a$ are always in complemental relation to each other since they are always in mesh with and so rotate oppositely to each other. Similarly if the cradle is positioned so that the wheels 916$^c$ are in mesh with the racks the wheels 916$^a$ will show by their complemental series of numerals as follows: 0,000,001.29. The relation between carrying cams in the units order and their respective transfer pawl feet will then be as illustrated in Figs. 14 and 15 from which it will be obvious that reverse rotation of pinions 916$^c$ will set up a 9. Now the true negative total is 1.30. Consequently before operating the machine with the total key down under the subtraction adjustment, the key 30 will be depressed with the effect above described of turning the units pinion 916$^c$ one step in the forward direction (see arrow in Fig. 15) thereby bringing that pinion to the zero position and tripping the transfer pawl so that the tens pinion 916$^c$ will advance one step. This having been done it will be obvious that in the ensuing totaling operation 1.30 will be set up and printed. Now if the operation is a subtotaling one the one cent must of course be restored to the wheels 916$^a$. This can be obviously done by using the key 30 when the cradle rocks to position the pinions 916 into operative relation with the racks.

Manipulative means are provided for changing the adjustment from addition to subtraction at will, said means taking the form of a lever 10 which protrudes through the keyboard and is pivoted upon a frame stud 10$^a$. When its upper end is rearward as in Figs. 1, 4 and 5 the adjustment is an adding one and when said upper end is forward the adjustment is a subtracting one. Under an adding adjustment of the lever 10 it is preferable that the key 30 be locked out under these conditions so as to the better characterize it as a negative key. To this end a slide piece 38 is arranged between the keyboard plates 212 and 213 and bifurcated at its rear end to embrace the stem 31 of the key 30 and enter a notch 31$^c$ therein. The slide is not positively connected to the lever 10 but a spiral spring 39 connects a forward part of the slide to the lever. A knob 40 secured to the slide and operating in a slot of the upper keyboard plate may be used to draw the slide forward independently of the lever 10 when it is desired to use the key 30 with said lever in the adding position as in case of the necessity for restoring the one cent as before mentioned. The slide is also used for normally locking out the total key when the lever 10 is in the subtracting or forward position. Another spring 39$^a$ connects a rear portion of the slide to the lever so that when the latter is thrown forward it projects the front end of the slide into a notch 227$^a$ of the total key bell-crank lever. The spring connection permits unlocking of the total key by pushing the knob 40 rearward, when the negative total is to be taken. The notch 227$^a$ is elongated so as to permit the beforedescribed depression of key 30 when the locking slide is forward, it being remembered that the latter operates a bell crank 36 having a stud 36$^a$ in engagement with the total key bell crank 227. It is the engagement of the upper end of the notch with the locking slide that limits depression of the key 30, as before referred to.

Passing now to the means operated by the shifting of the lever 10 to rock the cradle, said lever at its lower end is branched and widened at the inner portion of its rearwardly extending branch 10$^b$ to provide for an oblique cam slot 10$^c$ with enlarged substantially triangularly shaped end portions 10$^d$. A vertically extending bar 20 is bifurcated at its upper end to slide on the stud 10$^a$ and at an intermediate point carries a roller stud 19 occupying the aforesaid cam slot and normally (i. e. under the adding adjustment) engaging the lower portion of the enlargement 10$^d$ at the rear end of said slot (Fig. 1). The lower end of this bar is coupled to a bell-crank lever 21 loosely mounted upon the rock shaft 900 its upwardly extending arm being coupled to a link 22 which is coupled at its forward end to the left side piece 9$^L$ of the cradle. The shifting of the upper end of the lever 10 from the rear position to the forward position will cause the upper edge of the oblique part of the aforesaid cam slot to act upon the roller stud and thereby force down the bar 20 and rock the bell-crank 21, and through the medium of the link 22 rock the cradle so as to disengage the pinions 916 from the racks and engage the pinions 916$^c$ therewith as illustrated in Fig. 6. Before this occurs however there is a preliminary action whereby to disengage the pinions 916 from the racks so as to avoid a binding between them and the racks when the pinions are swinging on the pivot of the cradle. To this end the forwardly extending branch 10$^e$ of the controlling lever 10 has a cam terminal 10$^f$ which coöperates with a roller 910$^e$ upon the left hand pivot stud 916$^c$. The said cam terminal has front and rear converging edges and a connecting edge substantially concentric with the lever. Normally under the adding adjustment, the rear cam edge lies just forward of the roller 910$^e$ ready to act thereon when the lever 10 starts to shift. The camming action that takes place swings the pinions 910 with the rock shaft 900 as a center and disengages the pinions from the racks after the manner of their disengaging in ordinary adding operations. The same thing occurs when shifting from a subtracting to an adding adjustment, the front cam edge then acting upon the roller, see Fig. 6. The effect of this preliminary rocking of the main frame on the cradle shifting connections is to lift the bar 20 to a slight extent moving the roller stud 913 to the upper side of the enlargement at one end or the other of the cam slot 10$^c$ according to what the adjustment is at the time. Then the cradle shifting action takes place through the operation upon the upper or lower edge of the oblique portion of the cam slot on said roller.

It is desirable to securely lock the cradle in its two adjustments and this of course calls for an unlocking action effected by the lever 10 as a preliminary to the shifting of the cradle. The left side piece 9$^L$ of the cradle has a segmental forward extension 9$^e$ with two locking notches in the under side 9$^f$ and 9$^g$. A locking lever 15 is loosely mounted upon the rock shaft 900 and its forwardly extending arm terminates in a dog 15$^a$ adapted to engage either of the notches 9$^f$ 9$^g$. Under the adding adjustment it engages the notch 9$^f$ as shown in Figs. 1, 4 and 5, whereas under the subtracting adjustment it engages notch 9$^g$ as shown in Fig. 6. The rearward extending arm of said locking lever terminates in a double acting cam portion 15$^b$ which coöperates with a stud 10$^g$ carried upon the rear branch 10$^b$ of the lever 10. Normally under the adding adjustment said stud is in front of the forward cam edge of this portion 15$^b$ at the upper part thereof as shown in Figs. 1 and 4. During the first part of the shifting of the lever 10 from the adding position said stud will act upon said cam edge so as to rock the locking lever and disengage dog 15$^a$ from the notch 9$^f$. As this shifting of the lever 10 comes to an end the stud passes by the lower straight edge of the cam portion 15$^b$ and beyond the rear cam edge thereof so that the lever is returned to locking position by a spring 18 which is applied to its rear arm, Figs. 1, 4, 5 and 6. The cradle has meantime been rocked so that the dog 15$^a$ enters the notch 9$^g$. When the lever 10 is shifted from subtracting to adding position a similar action is had, the stud 10$^g$ then taking effect upon the rear cam edge of the portion 15$^b$ of the lever, see Fig. 6.

A relatively strong spring 23 is applied to the main rock frame as shown in Figs. 1, 4, 5 and 6 for the purpose of restoring the same to normal position after the cam 10$^f$ has passed by the roller 910$^e$ moving in either direction.

The locking of the registering wheels when out of mesh with the racks is accomplished in much the same way as heretofore though owing to the fact that there are two sets of wheels and a secondary rocking support for them, some modification is necessary. The numeral 25 designates the locking dogs of the usual character though in this instance they are pivoted upon a cross rod 26 carried by the cradle. The left-most dog has a stud 28, Figs. 1, 3, 4, 5 and 6 which projects into a slot 27$^a$ (for the most part arc-shaped) in the forwardly extending arm of a lever 27 loose upon the rock shaft 900. The rearwardly extending arm of this lever has a stud 27$^d$ engaging a bifurcation in a plate 927$^c$ unified with the locking bell-crank lever 927. The action is the familiar one of causing the dogs to either advance to meet the wheels when they are thrown forward or to follow the wheels a bit when they are thrown rearward, this being effected through coaction of the cam nose of the lever 927 with the similar nose at the rear end of the side piece 910L of the main rock frame. The slot 27$^a$ provides for maintaining a proper relation between the lever 27 and the dogs under both the adding and subtracting adjustments. In order that the action of the dogs may be uniform under both adjustments notwithstanding the stud 28 is nearer the center of the lever under a subtracting adjustment, the slot 27 is made with an oblique portion 27$^c$ down which the stud passes when the cradle is rocked to the subtracting position, see Fig. 6. Consequently when the locking lever 27 is actuated under these conditions there is a camming effect to compensate for the nearness of the stud to the center of the lever and the curtailment of movement of the dogs which would result if the slot was arc-shaped throughout.

The rocking of the main register frame under either subtraction or addition adjustment to first move the engaged set of pinions out of mesh with the racks and then return them to mesh therewith after the racks have descended distances determined by the key stops is accomplished in the ordinary way through pitman 914. Furthermore the totaling and subtotaling connections are such as are commonly employed, in which connection reference may be had to Patent No. 913,860 issued March 2, 1909.

As stated at the outset it is the purpose to provide not only for such direct manual control as above explained in the matter of setting the machine for addition or subtraction, but also for an automatic shift under control of a laterally movable paper carriage. To this end connections are provided between the levers 10 and certain tabulating devices and between said levers and the prime mover of the machine, so that when desired the shifting of the levers 10 may be brought about through action of the prime mover under control of said paper carriage. A pitman 180 is coupled to the lever 10 in rear of the slotted portion thereof and is branched at its rear end, the lower branch terminating in a hook 180$^a$ and the upper branch having a shoulder 180$^b$ and a short portion extending rearward from the base of said shoulder. Numeral 100 designates the familiar rock shaft which may be taken as the prime mover. In the present instance an arm 183 secured to said shaft is bifurcated to engage a roller stud 184$^a$ carried upon the lower arm of a lever 184 said lever carrying another stud 184$^b$ on its lower arm for coöperation with the hook 180$^a$ and carrying on its upper arm a stud 184$^c$ for coöperation with the shoulder 180$^b$. The pitman 180 may occupy a central or neutral position where it will be unaffected by the lever 184. Such will be its position when manual control only of the lever 10 is desired. The means for causing the pitman to take up and maintain such neutral position will hereinafter be pointed out in connection with description of the means for causing said pitman to assume upper and lower positions under control of the tabulating devices for causing automatic shifting of the lever 10 through coöperation of the stud 184$^c$ and the shoulder 180$^b$ or between the stud 184$^b$ and the hook 180$^a$.

The roller platen against which the type plates 816 are driven by the usual hammers 715 is designated by the numeral 170 and it is mounted in a familiar form of laterally shifting carriage. Reference may be had in this connection to Patents No. 929,056 issued July 27, 1909 and No. 977,582 issued December 6, 1910. Referring more particularly to Figs. 7 and 8 the numeral 171 designates tabulating fingers adjustably mounted upon a rock rod 170$^a$ in the carriage and adapted to coöperate with a fixed stop plate 172 on the frame of of the machine. The headed set screws 171$^a$ of such of these stop fingers as are to locate the carriage in position where subtracting operations will be called for by the work in hand supply journal bearings for rollers 171$^b$, whereas such screws of other stop fingers present bare stems or shanks. In the arrangement here shown for purposes of illustration and example there are nine stop fingers, the first of which (the right hand one in Fig. 6) locates the carriage in position for the printing of a date, or designating number or both if desired. The next stop finger positions the carriage for the printing of a plus amount representing a depositor's balance. The next two stop fingers position the carriage for the printing along a horizontal line of amounts deposited. The next three stop fingers position the carriage for the printing of amounts withdrawn or checked out. The next stop finger provides for extra spacing in the tabulation, and the final stop finger positions the carriage for the printing of the balance. Fig. 8$^a$ illustrates diagrammatically tabulated work which the machine will do automatically under this arrangement of stop fingers. It will be noted that the three stop fingers which are allotted to withdrawals carry rollers 171$^b$ whereas the balance of the stop fingers have the shanks or stems of their set screws bare.

There projects from the rear of the machine frame an elongated bearing stud 173 on which are journaled independently of each other a pair of yokes 174 and 175, Fig. 8. The yoke 174 has a laterally extending rear arm 174$^a$ with a cam nose at its extremity on the upper side adapted to coöperate with the rollers 171$^b$ and with the stems or necks of the other set screws 171$^a$. An inner oppositely extending arm 174$^e$ of said yoke has a stud 174$^c$ overlying an outer similarly extending arm 175$^a$ of the other yoke and a spring 176 connects said stud 174$^c$ with the arm 175$^a$, Fig. 7. An inner and similarly extending arm 175$^b$ of the yoke 175 has a slotted end portion which engages the extremity of the rear arm of a lever 177 which is pivoted intermediate its end upon a frame stud 178$^b$, Fig. 1. The forwardly extending arm of said lever 177 is slotted lengthwise thereof at an angle to the radial, to embrace a stud 180$^e$ on the aforesaid pitman 180. A spring 178 applied to the yoke arm 175$^b$, Fig. 7, tends to lower that arm and thereby elevate the pitman 180, and through the medium of the spring 176 elevate the yoke arm 174. If the yokes are unobstructed as will be the case when the cam nose of the yoke arm 174 is below a set screw 171$^a$ not equipped with a roller 171$^b$, the condition will be such as illustrated in Fig. 1, the spring 178 holding the pitman 180 in its upper position with the shoulder 180$^b$ in line with the stud 184$^c$ but beyond the range thereof since the adjustment shown in this figure of the drawings is an adding one and the pitman is therefore forward. Hence so long as this condition obtains operations under the adding adjustment will continue without interruption by the shifting of the carriage which may take place during the return movement of the operating handle. However, upon the arrival of the carriage at a position where a stop finger carrying a roller is against the stop plate 172, the roller acts upon the yoke arm 174ª depressing the same and through the medium of the spring 176 elevating the yoke arm 175ᵇ (said spring being superior to the spring 178) so that the lever 177 is rocked and the pitman 180 depressed bringing the hook 180ª down over the stud 184ᵇ. Obviously then in the next operation of the machine and during the forward pull of the operating handle the lever 10 will be shifted and a subtraction adjustment established so that the amount set up by depression of keys 291 will be subtracted through engagement of the racks with the pinions 916ᶜ during the ascent of said racks. At the conclusion of such operation the condition would be as depicted in Fig. 9. Upon the carriage thereafter arriving at a position where a finger engages the stop plate 172 which finger is not equipped with a roller the spring 178 will take effect to rock the yokes back to their original position thereby elevating the pitman 180 and establishing a condition such as illustrated in Fig. 10, the shoulder 180ᵇ being located just in front of the stud 184ᶜ. By then operating the machine the pitman would obviously be thrust forward and an adding adjustment effected, the parts being returned to the condition illustrated in Fig. 1.

The neutral adjustment of the pitman 180 which frees the lever 10 from control by the carriage, is effected through the use of a special key 210 at the upper right hand portion of the keyboard. A spring 210ᵇ applied to the stem 210ª of said key normally upholds the latter, Fig. 11, and the stem is guided at a lower offset portion by a stud 210ᶜ which engages a short vertical slot in the stem. The lower end of the stem is coupled to a short forwardly projecting arm of a vertically movable piece 212ª which has a forward upwardly projecting arm 212ᵇ bifurcated to embrace the key release bail rock shaft 207, and a rear depending arm 212ᶜ slotted in its upper widened portion to embrace a frame stud 212ᵈ. This depending arm 212ᶜ stands over an arm 213ª of a bell crank lever pivoted in the back panel or frame piece of the machine and having a downwardly extending arm 214ª. The latter is coupled to a thrust piece 214 which extends across the back of the machine and is longitudinally slotted to engage a frame stud 214ᵇ, Fig. 7. An upstanding portion 214ᶜ of this thrust piece is formed with jaws 214ᵈ which stand opposite a stud 175ᵈ on the yoke arm 175ª. Upon depression of the key 210 the thrust piece 214 will obviously be forced over to the right as the parts are seen in Fig. 7. Whether the yoke 175 is in its upper or lower position, it will be centered by the seating of the stud in the throat of the jaws 214ᵇ, as illustrated in Fig. 12.

This positions the pitman 180 as illustrated in Fig. 11, where it occupies a middle location with the shoulder 180ᵇ and hook 180ª out of the line of the studs 184ᶜ and 184ᵇ respectively. In order that this condition may indefinitely obtain without requiring continued depression of the key 210, the stem of the latter is formed with a notch 210ᶠ for engaging with one of the keyboard plates whereby to keep the key down in a familiar manner.

Depression of the key 210 is practised only when the tabulating mechanism is not to be called into play and therefore in order that single column work may proceed regardless of the particular location of the paper carriage and without rearranging the tabulating stops, connections are provided whereby said key will disable the tabulating mechanism and enable the line spacing mechanism. In this connection it will be well to refer briefly to the line spacing devices which are on the same order as those illustrated in the before mentioned Patents Nos. 929,056 and 977,582, particularly the latter.

The familiar form of line spacing bail is designated by the numeral 190, and the two vertical slides which engage the same are designated by the numerals 191 and 192. The slide 191 has an ear 191ª by which connection is had as usual with a lever 193, Fig. 1, vibrated in every operation of the machine by cam plate 194 secured to rock shaft 100. Said slide 191 has pivotally mounted on a lower offset portion a dog 194', Fig. 12, shouldered at 194ª to engage the upper edge of flange 192ª on slide 192 for the purpose of establishing connections to effect line spacing when the carriage in tabulating work reaches the final position as determined by a shorter stop finger which does not strike the top lug of the dog and disengage it from said flange as the longer fingers do against the stress of the dog spring 194ᶜ, Fig. 12. In the present instance, in addition to the dog 194, there is pivoted on the same stud a connector piece 195 flanged as its upper end to engage a slot 192ᵇ in the flange 192ª, but normally held by a spring 195ª out of engagement of said flange, as illustrated in Fig. 7. Said connector piece is thrown over into engagement with the flange by depression of the key 210. To this end the thrust piece 214 has at an intermediate point an upstanding finger 214ᵉ which, when the key is depressed, acts against a stud 195ᶜ on the connector piece which stud serves also for attachment of the spring 195ª. Besides serving to thus connect the two line spacing slides, said piece 195 operates to displace the dog so as to stop the tabulating. Thus the flange of the connector piece acts against the edge of the dog as illustrated in Fig. 12 forcing the dog to a position where its top lug is out of line with the column stop finger. It will be understood that in the former constructions thereof the dog is similarly displaced by a long column stop finger striking against the side of its top lug, and the latter in the lowering of the slide 191 disengages from said finger and snaps under the same so that when the slide rises with the return of the operating handle, the top of the said lug acts against the under side of said finger and lifts it out of engagement with the stop plate 192. In the present construction when the key 210 is depressed the dog continues to be displaced so that its top lug does not so act upon the flange and consequently the carriage will remain at the one columnar position while single column work goes on, line spacing occuring in each operation.

It will be remembered that when the lever 10 is shifted from either of its adjusted positions there is a momentary disengagement from the racks of whichever set of pinions is in mesh therewith at the time. It would be objectionable and in fact would seriously interfere with the proper performances of the machine for the totaling or subtotaling key to be depressed at such time. This would hardly occur where the lever was being shifted by hand but in cases where the shift was taking place automatically such a thing might occur to the serious interference with the work done by the machine. Consequently suitable provisions are made for preventing its occurrence. The familiar totaling key link 226 has a lug 197 on the outer side, Fig. 1, and a bar 198 is arranged to work up and down just in rear of said lug, said bar having a projection 198$^a$ whose straight forward edge will coöperate with the lug. The bar is bifurcated at its upper end to engage the key release rock shaft 207 for guiding purposes and at its lower end is coupled to a radius bar 199 pivoted on a frame stud 199$^a$. The coupling stud 199$^b$ projects for engagement with the pitman 180 which is formed midway its upper branch with a shoulder 180$^d$ and at the base of this branch with a slightly depressed seat 180$^f$. The arrangement is such that under either adjustment of the pitman 180 which prepares for a shift of the lever 10 the projection 198$^a$ will stand in the path of the lug 197 and prevent depression of the total or subtotal key. Figs. 1 and 9 represent conditions when this obstruction does not exist. Thus in Fig. 1 the pitman is forward and elevated and the stud is resting upon the shoulder 180$^d$ which holds the bar 198 up with its projection 198$^a$ above the lug 197. In Fig. 9 the pitman is rearward and depressed and the stud 199$^b$ is upon the seat 180$^f$, the projection 198$^a$ being below the lug 197. If under the latter condition the pitman is raised to bring the shoulder 180$^b$ immediately in front of the stud 184$^c$ as illustrated in Fig. 10 the projection 198$^a$ will be raised into the path of the lug 197. So also if the condition obtains that is illustrated in Fig. 1 and the pitman should be lowered bringing the hook 180$^a$ immediately behind the stud 184$^b$, the projection 198$^a$ will move down behind the lug 197. If the pitman is simply moved to an intermediate or neutral position the projection will not enter the path of the lug whether the stud 199$^a$ is resting upon the shoulder 180$^d$ or the seat 180$^f$, for in neither case will the bar 198$^a$ be moved far enough to bring about the total key locking relation.

It will be understood of course that the paper carriage is impelled by a spring after the manner of a typewriter carriage. In Fig. 20, the numeral 17 designates the spring barrel and 17$^a$ the band connecting the same to the carriage frame 17$^b$.

Special printing to designate the character of items recorded is provided for through the same sort of arrangement as disclosed in Patent No. 1,018,285, issued Feb. 20, 1912, to which reference may be had for a detailed description of the construction and mode of operation of the similar arrangement here shown in Figs. 2 and 21. The latter figure of the drawings shows a permanent split, for date printing purposes, between the second latch 715 to the right and the third latch 715$^a$. To prevent printing a total carried by the wheels of these two right hand orders (a total of date numerals would be meaningless and confusing), the tails of two latches 415, (tails that ordinarily are acted upon by the bail rod 226$^a$ when total or subtotal key is depressed) may be omitted as shown in Figs. 1 and 1$^a$.

I claim:

1. The combination with reciprocatory wheel actuators; of wheels adapted to be directly turned thereby but capable of disconnection therefrom as to direct turning thereby; intermediate wheels for transmitting motion between said actuators and the first-mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a prime mover; and connections from latter for operating the aforesaid means for putting either set of wheels into direct operative relation with the actuators.

2. The combination with reciprocatory wheel actuators; of wheels adapted to be directly turned thereby but capable of disconnection therefrom as to direct turning thereby; intermediate wheels for transmitting motion between said actuators and the first-mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a prime mover; connections from latter for operating the aforesaid means for putting either set of wheels into direct operative relation with the actuators; and means for reversing said connections.

3. In a machine of the character described, the combination with actuators and manipulative amount-determining means, registering wheels and mechanism for regulating engagement between the same and the actuators for rotation thereby in either direction under control of said amount-determining means, printing mechanism, and a laterally shiftable paper carriage; of means for controlling the setting of the aforesaid regulating mechanism by said paper carriage whereby addition may be had of items printed in one columnar position of said carriage and subtraction of items printed in another columnar position thereof together with manipulative means for setting said regulating mechanism independently of the carriage.

4. In a machine of the character described, the combination with actuators and manipulative amount-determining means, registering wheels and mechanism for regulating engagement between the same and the actuators for rotation thereby in either direction under control of said amount-determining means, printing mechanism, and a laterally shiftable paper carriage; of means for controlling the setting of the aforesaid regulating mechanism by said paper carriage, whereby addition may be had of items printed in one columnar position of said carriage and subtraction of items printed in another columnar position thereof together with manipulative means for setting said regulating mechanism independently of the carriage and disabling the carriage connections.

5. In a machine of the character described, the combination with actuators and manipulative amount-determining means, registering wheels and mechanism for regulating engagement between the same and the actuators for rotation thereby in either direction under control of said amount-determining means, printing mechanism, a laterally shiftable paper carriage, stops for fixing successive columnar positions of the carriage, and means for releasing the latter; of means for controlling the setting of the aforesaid regulating mechanism by said paper carriage whereby addition may be had of items printed in one columnar position of said carriage and subtraction of items printed in another columnar position thereof, together with manipulative means for setting said regulating mechanism independently of the carriage and disabling the carriage connections and the carriage releasing means.

6. In a machine of the character described, the combination with actuators and manipulative amount-determining means, registering wheels and mechanism for regulating engagement between the same and the actuators for rotation thereby in either direction under control of said amount-determining means, printing mechanism, a laterally shiftable paper carriage, stops for fixing successive columnar positions of the carriage, means for releasing the latter, and line spacing mechanism; of means for controlling the setting of the aforesaid regulating mechanism by said paper carriage whereby addition may be had of items printed in one columnar position of said carriage and subtraction of items printed in another columnar position thereof together with manipulative means for setting said regulating mechanism independently of the carriage and disabling the carriage connections and the carriage releasing means, and also enabling the line spacing mechanism.

7. The combination with reciprocatory type carriers and wheel actuators; of wheels adapted to be directly turned thereby but capable of disconnection therefrom as to direct turning thereby; intermediate wheels for transmitting motion between said actuators and the first-mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a laterally shiftable paper carriage; carriage connections for controlling the aforesaid means for putting either set of wheels into direct operative relation with the actuators; a prime mover; and connections therefrom for operating said latter means.

8. The combination with reciprocatory type carriers and wheel-actuating racks; of two sets of gear wheels separately engageable with the racks and geared to each other; means for putting either set of wheels into direct operative relation with the racks; means for reciprocating the latter; means for variously measuring excursions thereof; means for regulating the periods of engagement and disengagement between racks and wheels; a laterally shiftable paper carriage; carriage connections for controlling the aforesaid means for putting either set of wheels into direct operative relation with the actuating racks; a prime mover; and connections therefrom for operating said latter means.

9. The combination with reciprocatory type carriers and wheel-actuating racks; of two sets of gear wheels separately engageable with the racks and geared to each other, means for putting either set of wheels into direct operative relation with the racks; means for reciprocating the latter; means for variously measuring excursions thereof; means for regulating the periods of engagement and disengagement between racks and wheels; a laterally shiftable paper carriage; carriage connections for controlling the aforesaid means for putting either set of wheels into direct operative relation with the actuating racks; a prime mover; and connections therefrom for operating said latter means; one set of wheels being normally in mesh with the racks and the last mentioned means including provisions for first unmeshing said wheels and then effecting the shift.

10. In a machine of the character described, the combination with actuators and manipulative amount-determining means, registering wheels and mechanism for regulating engagement between the same and the actuators for rotation thereby in either direction under control of said amount-determining means, printing mechanism, and a laterally shiftable paper carriage and a prime mover; of connections for setting said regulating mechanism by the prime mover under control of the paper carriage whereby addition may be had of items printed in one columnar position of said carriage and subtraction of items printed in another columnar position thereof together with manipulative means for setting said regulating mechanism independently of the carriage and the prime mover.

11. In a machine of the character described, the combination with actuators and manipulative amount-determining means, registering wheels and mechanism for regulating engagement between the same and the actuators for rotation thereby in either direction under control of said amount-determining means, printing mechanism, and a laterally shiftable paper carriage and a prime mover; of connections for setting said regulating mechanism by the prime mover under control of the paper carriage whereby addition may be had of items printed in one columnar position of said carriage and subtraction of items printed in another columnar position thereof together with manipulative means for setting said regulating mechanism independently of the carriage and neutralizing the connections for setting by the latter.

12. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a laterally shiftable paper carriage; a prime mover, and connections operable by the latter and set for operation by the carriage to determine which set of wheels shall coöperate with the actuators.

13. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a laterally shiftable paper carriage having column stop fingers differently equipped for controlling coöperative relationship between actuators and one or the other set of wheels; and wheel shifting connections controlled by said stop fingers.

14. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a pitman connected to the aforesaid means for putting either set of wheels into direct operative relation with the actuators; a prime mover and connections of duplex character for shifting the pitman; a laterally shiftable paper carriage having column stop fingers differently equipped for regulating the relation between the prime mover connections and the said pitman; and devices operated under control of said fingers for setting the pitman.

15. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels, a pitman connected to the aforesaid means for putting either set of wheels into direct operative relation with the actuators, said pitman having oppositely facing abutment shoulders spaced apart transversely of the pitman; a lever having studs on opposite sides of its pivot to coact respectively with said shoulders; a prime mover operatively connected with said lever; a setting lever applied to the pitman; an oscillatory structure for operating said setting lever; and a laterally shiftable paper carriage having column stop fingers to control said oscillatory structure, said fingers being differently equipped for determining the disposition of said structure.

16. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a pitman connected to the aforesaid means for putting either set of wheels into direct operative relation with the actuators, said pitman having oppositely facing abutment shoulders spaced apart transversely of the pitman; a lever having studs on opposite sides of its pivot to coact respectively with said shoulders; a prime mover operatively connected with said lever; a setting lever applied to the pitman; an oscillatory structure for operating said setting lever; and a laterally shiftable paper carriage having column stop fingers to control said oscillatory structure, one finger having a shank permitting movement of the structure to the limit in one direction and another finger having a shank carrying means for moving the structure to the limit in the other direction.

17. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a pitman connected to the aforesaid means for putting either set of wheels into direct operative relation with the actuators; a prime mover and connections of duplex character for shifting the pitman; a laterally shiftable paper carriage having column stop fingers differently equipped for regulating the relation between the prime mover connections and the said pitman; devices operated under control of said fingers for setting the pitman in one extreme position or the opposite; and manipulative means for locating the pitman in a neutral position.

18. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a pitman connected to the aforesaid means for putting either set of wheels into direct operative relation with the actuators; a prime mover and connections of duplex character for shifting the pitman; a laterally shiftable paper carriage having column stop fingers differently equipped for regulating the relation between the prime mover connections and the said pitman; devices operated under control of said fingers for setting the pitman in one extreme position or the opposite; and a key and connections for locating the pitman in a neutral position.

19. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; a pitman connected to the aforesaid means for putting either set of wheels into direct operative relation with the actuators; a prime mover and connections of duplex character for shifting the pitman; a laterally shiftable paper carriage having column stop fingers differently equipped for regulating the relation between the prime mover connections and the said pitman; devices operated under control of said fingers for setting the pitman in one extreme position or the opposite; manipulative means for locating the pitman in a neutral position; line spacing mechanism comprising engageable and disengageable members held disengaged by a carriage stop finger; and means for engaging said members by said manipulative means.

20. The combination with reciprocatory type carriers and wheel actuators, of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels, a pitman connected to the aforesaid means for putting either set of wheels into direct operative relation with the actuators; a prime mover and connections of duplex character for shifting the pitman; a laterally shiftable paper carriage having column stop fingers differently equipped for regulating the relation between the prime mover connections and the said pitman; devices operated under control of said fingers for setting the pitman in one extreme position or the opposite, manipulative means for locating the pitman in a neutral position; line spacing mechanism comprising slides one with a flange and the other with a spring-held dog to engage the flange and be engaged by a carriage stop finger, and to act upon the latter in reciprocation of the dog-carrying slide for releasing the carriage from a columnar position; and a spring-retracted connector piece on the dog-carrying slide adapted to engage the flange of the other slide and the dog, and operated by the aforesaid manipulative means.

21. The combination with reciprocatory type carriers and wheel actuators; of wheels adapted to be directly turned thereby but capable of disconnection therefrom as to direct turning thereby; intermediate wheels for transmitting motion between said actuators and the first mentioned wheels when the latter are so disconnected from the former; means for putting either set of wheels into direct operative relation with the actuators; means for reciprocating the latter; means for variously measuring excursions thereof; means for regulating the periods of engagement and disengagement between actuators and wheels; two sets of stops, one for each set of wheels, adapted to limit reverse rotation thereof; transfer mechanism effective with either set of wheels in direct operative relation with the actuators; and means independent of those previously recited for effecting at will a one-step movement of the units order actuator.

22. The combination with reciprocatory type carriers and wheel-actuating racks; of two sets of gear wheels separately engageable with the racks and geared to each other; means for putting either set of wheels into direct operative relation with the racks; means for reciprocating the latter; means for variously measuring the excursions thereof; means for regulating the periods of engagement and disengagement between racks and wheels with provisions for reversing the order at will; two sets of stops, one for each set of wheels, adapted to limit reverse rotation thereof; transfer mechanism effective with either set of wheels in direct operative relation with the actuators; and means independent of those previously recited for effecting at will a one-step movement of the units order actuating rack.

23. In a machine of the character described, the combination of reciprocating racks arranged in denominational series, carriers therefor, spring-connected therewith, for limited relative movement, a displaceable stop piece normally obstructing the units order rack, a key and connections for displacing said stop piece, two sets of gears interengaged and either engageable with the racks, transfer mechanism effective with either set of gears engaged with the racks, and controlling mechanism for regulating periods of engagement of either set of gears with the racks, together with stop mechanism for limiting reverse turning of gears to zero position.

24. In a machine of the character described, the combination with actuators and manipulative amount-determining means; of two sets of wheels intermeshed, and a support for said wheels movable to establish coöperative relationship between either of said sets of wheels and the actuators, the wheels of one set each having two series of numerals reversely arranged with respect to each other, with provisions for displaying under one adjustment of the support the complement of the number displayed under the other adjustment of said support.

25. In a machine of the character described, the combination with actuators and manipulative amount-determining means; of two sets of wheels intermeshed, and a rocking support for said wheels whereby to establish coöperative relationship between either set and the actuators, the wheels of one set each having two series of numerals on its periphery reversely arranged, and the said support carrying a shield with two sets of sight-openings, one disclosing numerals of corresponding series, and the other disclosing the complemental numerals of the other corresponding series.

26. In a machine of the character described, the combination of racks; a rocking frame; a cradle therein; two sets of intermeshed gears in the cradle on opposite sides of its pivotal mounting in the frame and either adapted to mesh with the racks; means for rocking the frame to regulate periods of engagement and disengagement between either set of gears and the racks; and manipulative means for rocking the cradle with provisions for preliminarily rocking the frame.

27. In a machine of the character described, the combination of racks; a rocking frame; a cradle therein; two sets of intermeshed gears in the cradle on opposite sides of its pivotal mounting in the frame and either adapted to mesh with the racks; means for rocking the frame to regulate periods of engagement and disengagement between either set of gears and the racks; and means for rocking the cradle.

28. A shifting counting mechanism for computing machines, comprising in combination, a set of counting wheels, means for setting said counting wheels having a normal engagement with the latter, means for shifting the counting mechanism from one computing position to another, and means for radially moving said counting wheels out of their normal engagement with said setting means before the operation of shifting from one computing position to another.

29. A shifting counting mechanism for computing machines, comprising in combination, a set of counting wheels, means for setting said counting wheels having a normal engagement with the latter, a housing for said counting wheels, means to shift said counting wheels from one computing position to another, and a cam-mechanism for shifting said housing in a direction radial to said counting wheels to release the latter from said setting devices during the shift from one computing position to another.

FRANK C. RINSCHE.

Witnesses:
W. L. HOAGLAND, Jr.,
C. A. ALSPAS.